United States Patent [19]

Monroe

[11] Patent Number: 5,421,589
[45] Date of Patent: Jun. 6, 1995

[54] METHOD AND APPARATUS FOR DISPLAYING AN ALPHA CHANNEL VIRTUAL IMAGE

[75] Inventor: Marshall M. Monroe, Glendale, Calif.

[73] Assignee: The Walt Disney Company, Burbank, Calif.

[21] Appl. No.: 118,385

[22] Filed: Sep. 7, 1993

Related U.S. Application Data

[63] Continuation-in-part of Ser. No. 62,304, May 14, 1993, Pat. No. 5,368,309.

[51] Int. Cl.[6] .................................................. A63F 9/22
[52] U.S. Cl. ........................................ 273/437; 345/9; 353/37; 359/629
[58] Field of Search ....... 273/433, 434, 437, DIG. 28, 273/310, 312, 313, 316, 85 G; 345/1, 4, 7, 8, 9, 37, 38, 87; 353/28, 30, 37; 359/471, 472, 477, 629, 630

[56] References Cited

U.S. PATENT DOCUMENTS

| | | | |
|---|---|---|---|
| 4,084,194 | 4/1978 | Hector | 273/DIG. 28 |
| 4,189,145 | 2/1980 | Stubben et al. | 273/DIG. 28 |
| 4,306,768 | 12/1981 | Egging | 273/437 |
| 4,378,955 | 4/1983 | Bleha, Jr. et al. | 350/334 |
| 4,403,216 | 9/1983 | Yokoi | 345/9 |
| 4,568,080 | 2/1986 | Yokoi | 273/434 |
| 4,589,659 | 5/1986 | Yokoi et al. | 345/7 |
| 4,799,765 | 1/1989 | Ferrer | 350/174 |
| 4,879,603 | 11/1989 | Berman | 358/242 |
| 4,900,133 | 2/1990 | Berman | 350/346 |
| 4,971,312 | 11/1990 | Weinreich | 272/8 M |
| 4,973,951 | 11/1990 | Shigeta et al. | 340/717 |
| 4,987,410 | 1/1991 | Berman et al. | 345/9 |
| 5,190,286 | 3/1993 | Watanabe et al. | 273/85 G |
| 5,221,083 | 6/1993 | Dote | 273/85 CP |

Primary Examiner—Jessica J. Harrison
Attorney, Agent, or Firm—Hecker & Harriman

[57] ABSTRACT

The present invention is directed to a method and apparatus for displaying a virtual image and for providing control over the "alpha channel" or transparency of the virtual image. The present invention uses a beam splitter to provide a virtual image to a viewer. Behind the beam splitter is a liquid crystal region for controlling the transparency of the virtual image. Behind the liquid crystal region is a background image. Control of the liquid crystal region is coordinated with control of the virtual image so as to make transparency and opacity of the liquid crystal region follow the portions of the virtual image that are intended to be transparent and opaque, respectively.

25 Claims, 14 Drawing Sheets

PLAYER A

PLAYER B

PLAYER A

PLAYER B

PLAYER A

PLAYER B

PLAYER A

PLAYER B

| | 3A | 3B | 3C | 3D |
|---|---|---|---|---|
| | A/B | A/B | A/B | A/B |
| RESULTING IMAGE | REFLECTION REFLECTION | ORIGINAL ORIGINAL | REFLECTION ORIGINAL | MODIFIED ORIGINAL ORIGINAL |
| GRAPHICAL ELEMENTS | — | ◯ ◯ | ◯ | ◯ |
| CONTROL ELEMENTS | ◯ ◯ | — | ◯ | ◯ |
| TEXTUAL ELEMENTS | — | ◯ ◯ | — ◯ | ◯ ◯ |

FIG. 7

METHOD AND APPARATUS FOR DISPLAYING AN ALPHA CHANNEL VIRTUAL IMAGE

The present application is a continuation in part of U.S. patent application Ser. No. 08/062,304 filed May 14, 1993, now U.S. Pat. No. 5,368,309.

BACKGROUND OF THE INVENTION

1. Field of the Invention

This invention relates to the field of virtual images.

2. Background Art

Many existing entertainment or amusement games rely on a conventional CRT display ("television" display). A player's point of view is trained on the television display. It is difficult for a player to divert attention to anything other than the display unless the diversion requires only a minimal perspective change. For example, a player would have difficulty remaining attentive to a video game display and making eye contact with another individual unless that individual's face was in close proximity to the video display.

Some games provide a multiple player mode. In multiple player mode, players either alternate "turns" in interacting with the game, or the players sit "side-by-side" and compete against each other, or cooperate against a common opponent. Whether the players are competing against one another or cooperating against a common opponent, it is not possible to see the expressions on each other's faces or determine the position of the other player's line of sight.

Because the players sit side-by-side when using prior art games, direct human interaction is unavailable. Thus, conventional video games are lacking in that players can't directly experience the reactions of their opponents or partners.

For example, Berman, U.S. Pat. No. 4,879,603, provides a way for adjacent users to view different images on a heads up display. The system uses circular polarization to project multiple images. By using appropriate filters (e.g. eyeglasses), each user sees only one of the projected images.

Ricker, U.S. Pat. No. 4,535,354, provides a method for projecting a pair of stereoscopic pictures that can be seen in three dimensions. Two projection images are projected onto a focusing screen. A beam splitter that acts as a reflector and transmitter is positioned between an observer and the focusing screen, or between the source images and the focusing screen. The system can be adapted for multiple users if they are located laterally to each other. There is no discussion of opposing views in Ricker.

Breslow, U.S. Pat. No. 4,710,873, describes a video game apparatus for capturing an image of a user, digitizing the image, and incorporating the image into the video game itself. A camera is included in the cabinetry of the video game and is used for image capture. The captured image is displayed on a prior art type video display.

Rebane, U.S. Pat. No. 3,857,022, provides a system including a positioning table that provides a signal representative of the position of a pen touched to a screen. An image can be projected onto the touch screen from behind, if the screen is translucent, or from the front, if the screen is opaque.

Yokoi, U.S. Pat. No. 4,589,659, is directed to a liquid crystal display that projects an image onto a mirror for viewing. The scheme permits an LCD display to be folded to a compact size and is suitable for portable video game use. The device is for viewing from one side only, or side by side viewing.

A heads up display system with holographic dispersion correction is described in Hartman, U.S. Pat. No. 4,613,200. The invention uses a grating device attached to a windshield and a second grating device under the dash. The device appears to be tuned to be optimized for a driver.

A stereoscopic display that provides alternating left and right images to create the illusion of depth is described in Pund, U.S. Pat. No. 4,649,425. The display is for viewing from one direction only.

A reflected display is described in Japan 1-47422 to Kuwayama. One party can simultaneously view display information and a party opposite a display screen. Unlike the present invention, the purpose of Kuwayama is to prevent the second party from viewing the displayed information. Such a scheme precludes "see through" viewing by two opposing viewers.

An illusion apparatus is described in Weinreich, U.S. Pat. No. 4,971,312. This scheme permits a human viewer to appear to interact with a display such as a television or monitor.

A double sided display of dot matrix LED or LCD display units is described in Shigeta, U.S. Pat. No. 4,973,951. The scheme is not related to video displays. The opposing displays are not see through, but rather opaque members are disposed between the displays.

A heads up display for an automobile or other moving vehicle is described in Roberts, U.S. Pat. No. 5,005,009. The invention is not related to video games.

Yamamura, JP-18588, describes a two direction heads up display device. Viewers on either side of a glass panel can see independent images with virtually no cross-talk between the images. There is no discussion of viewing both displayed images and the opposing viewer simultaneously, or matching the images to provide coincident "points of interest" of the projected images.

Harris, U.S. Pat. No. 5,115,228, describes a shuttered display panel that is viewable from the front and the back simultaneously. A see through display that can be viewed from both the front and back, e.g. a vacuum fluorescent display, is provided. When it is desired to show different images to the front and back users, an image is generated for the front viewer while the rear shutters are closed. A second image is generated for the rear viewer while the front shutters are closed. A video game that matches video display with user speech is described in Edelstein, U.S. Pat. No. 5,149,104.

A method for superimposition of projected and three dimensional objects is described in Lunde, U.S. Pat. No. 4,738,522. The system provides a method for using a beam splitter to combine the movement of an actor on a three dimensional set with a projected image. The beam splitter is provided in front of the three dimensional set. A recorded or live image is projected onto the beam splitter, forming a combined image. The projected image appears to interact with the three dimensional set pieces.

Prior art beam splitter and heads up display techniques have the characteristic of the virtual image being partially transparent. While partial transparency of the virtual image may be desirable in some situations, it is often desirable to provide control over the transparency or opacity of a virtual image. Prior art beam splitter and heads up display techniques have not provided such control.

SUMMARY OF THE INVENTION

The invention is directed to an interactive video game whereby players sit opposite each other and view the game and each other through a semi-transparent image generated in real-time through the use of a first-surface reflection. The present invention uses opposing Heads-Up Displays (HUDs). A HUD is composed of a transparent, partially reflective material (e.g., glass, acrylic (Plexiglas), or polycarbonate (Lexan)). A HUD is placed in an angular position and serves as a "beam-splitter" such that the image is, in essence, superimposed on the objects behind the image. Many types of interactive experiences are possible with the present invention including video games and fashion and data visualizations.

Using opposing HUDs, a virtual image can be apparently suspended between two players. The HUD surface has sufficient transparency to allow each player to see the other player along with the image. Thus, the players can interact during play allowing for a more realistic and rewarding experience. The effect could be further enhanced by the use of stereo glasses and a stereo-pair of images on the display such that the players see 3-D images on the playing "surface."

To further enhance the interactive experience, the virtual images are substantially coincident so that when one player looks up from the action in the game to see the opponent, the opponent's eyes are looking at roughly the same spot in space where the first player perceives the action to be. The present invention provides the ability to rotate the images seen by the players such that the opposing images have the same orientation. Thus the lines of sight for each of the opposing players is the same.

The present invention yields more direct communication between players, as well as an enhanced experience. Other games can take advantage of the fact that the image is superimposed on the opponent such as trying new facial features or clothing.

The present invention may be used to provide a multi-level display where at least one level has at least one discrete, dynamic image region having a diffusion level that may be variably adjusted between substantially opaque and substantially transparent levels, thereby occluding or revealing objects or images in other levels. Such a multi-level display provides the ability to produce a realistic, opaque image that can be made to "disappear", to move in a "transparent field", or both. The present invention employs a beam splitter technique to provide a virtual image combined with one or more liquid crystal regions positioned so as to be optically coincident with the virtual image or a portion thereof.

To make parts of the virtual image opaque, the corresponding liquid crystal region or regions are placed in their diffuse state while the desired parts of the virtual image are displayed to a viewer. To make parts of the virtual image "disappear" (i.e. become transparent), the appropriate liquid crystal regions are placed in their transparent state and the corresponding parts of the virtual image are made "black" (i.e. non-illuminated) so as not to produce a visible reflection from the beam splitter. By varying the diffusion levels of the liquid crystal regions and the brightness of the corresponding regions of the virtual image, the transparency of the composite image may be controlled over a wide range from substantially complete transparency to substantially complete opacity. The term "alpha channel" is used in the computer graphics industry to represent local transparency levels of a texture or surface. Thus, the present invention provides alpha channel control of a virtual image.

BRIEF DESCRIPTION OF THE DRAWINGS

FIG. 7 illustrates a table that represents the four pairs of resulting images of FIGS. 3A-3D.

DETAILED DESCRIPTION OF THE INVENTION

A method and apparatus for a virtual video game is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The invention is directed to an interactive video game whereby players sit opposite each other and view the game and each other through a variably transparent image. The transparency of the image may be controlled using an LCD element. By reducing the transparency of the image, the image can be made to be opaque or to have any level of transparency between transparent and opaque. When the image is sufficiently opaque, the players can be kept from seeing one another. The image is generated in real-time through the use of a first-surface reflection. The present invention uses opposing Heads-Up Displays (HUDs). Many types of interactive experiences are possible with the present invention including video games and fashion and data visualizations.

The present invention allows an image to appear to be suspended between two players. The HUD has sufficient transparency to allow each player to see the other player along with the image. Thus, the players can interact during play allowing for a more competitive and realistic experience.

Figure 1A:
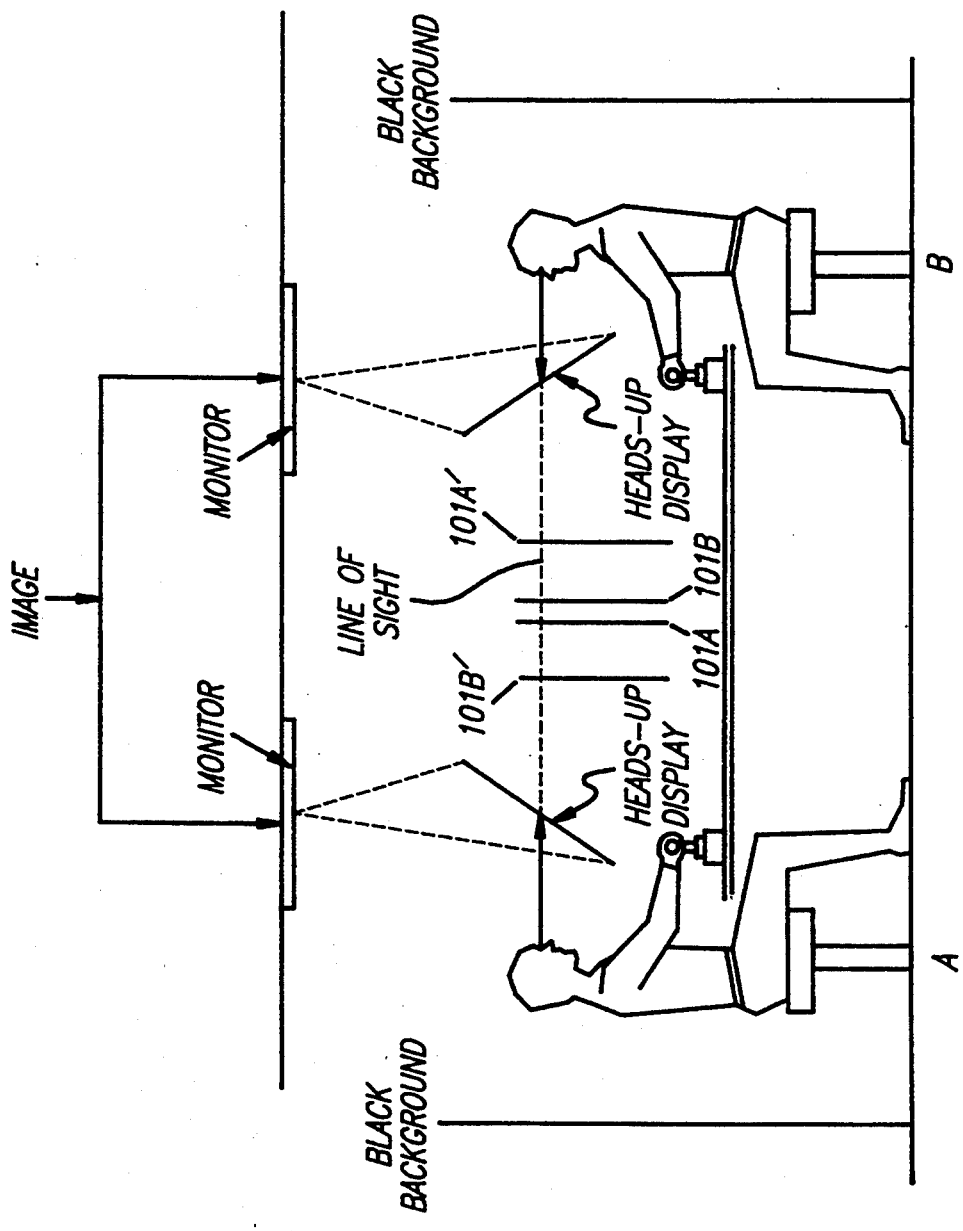
FIG. 1A illustrates a layout for the present invention using two players.

FIG. 1A illustrates a layout for the present invention using two players. It should be noted that even though only two players are illustrated, the present invention can be adapted to accommodate multiple players.

In FIG. 1A, the two players are sitting opposite each other and each is positioned in front of a HUD. A HUD is composed of a transparent, partially reflective material (e.g., glass, acrylic (Plexiglas), or polycarbonate (Lexan)). The HUD is placed in an angular position and serves as a "beamsplitter" such that the image and opposing player are composited into one. The image is, in essence, superimposed on the opponent.

The superimposition provided by the present invention yields more direct communication, as well as an enhanced experience. Superimposition creates additional applications such as where each player sees any number of images which correspond to the image of the "opponent," or "electronic painting" applications. Other games can take advantage of the fact that the image is superimposed on the opponent such as trying new facial features or clothing.

The effect of the present invention could be further enhanced by the use of stereo glasses and a stereo-pair of images on the display such that the players see 3-D images on the playing "surface."

Heads-Up Display Position

Referring to FIG. 1A, an original image is provided by an image source (e.g., video game or animated display). The original image is displayed on a monitor positioned overhead. Even though the monitor is shown above the HUD in FIG. 1A, it should be noted that a monitor can be positioned in any location (e.g., below the HUD) such that the image can be reflected off of the HUD.

To preserve the virtual video effect, the monitors may be obscured from the direct line of sight of the players. This can be accomplished by any number of devices such as micro-louvers, baffles or polarizers. Further, the image can be displayed on a monitor with a black background, so that the players don't perceive a complete, full-field virtual image.

To ensure that the virtual image does not appear faded or washed out, a dark backdrop of background can be placed behind each player. This will eliminate surrounding light that can fade the virtual image. The backdrop can be a dark shade such as black.

The image displayed on the monitor is a reflected from the HUD to a player. This display technique is used for each player. Thus, each player sees the game through their respective HUDs. Each HUD has an angular orientation relative to the "line-of-sight" of the viewer such that each player can view the displayed image and an opposing player with virtually no line of sight modification for either player.

Thus, each HUD provides a "beam-splitter" capability to allow a player to see two images composited into one. The two images are the dimensional (or "real") one of the "opponent" and the "virtual" one of the game display which is actually a first-surface reflection of the monitor overhead.

The virtual image appears to the observing player to be beyond the HUD. As illustrated in FIG. 1A, player A sees a virtual image 101A approximately midway between player A and player B. Player B sees virtual image 101B approximately midway between the two players. This is for purposes of example only. The images could be substantially coincident with each other, but that is not required. If desired, the virtual images could "appear" much closer to the viewing player or further away from the viewing player. In fact, the images could appear to "cross", as illustrated by virtual images 101A' and 101B'. It appears that virtual image 101A' is "behind" virtual image 101B'. Of course, the images do not actually cross, but rather the apparent spatial location of the image changes.

Further, the virtual image appears to the observing player to be suspended in space. To reinforce a player's notion that the image is suspended in space, setup pieces can be positioned within the plane of view. These setup pieces can extend from a surface (e.g., table) via a supporting element. The support structure of a setup piece will therefore be in contrast with the perceived lack of support for the HUD image. This will further support a player's notion that the HUD image is suspended in space.

Figure 1B:
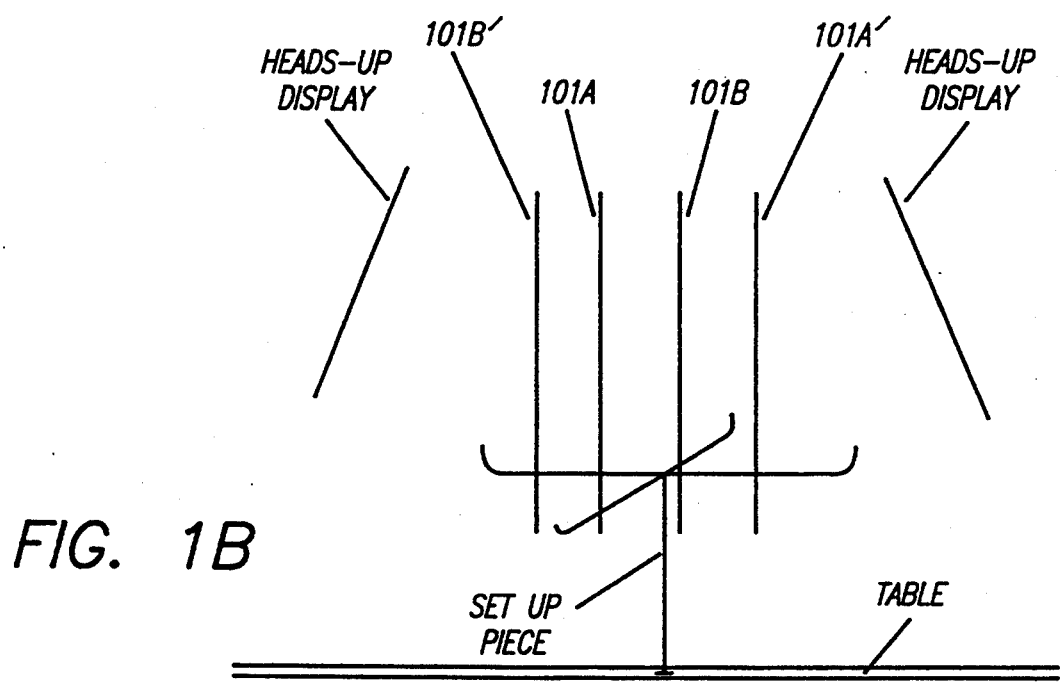
FIG. 1B illustrates a setup piece.

FIG. 1B provides an example of a setup piece. The set up is comprised of a vertical piece affixed to the table and two horizontal pieces curved at both ends. This gives a sense of structure and depth. The set up piece can be seen while viewing the virtual images 101A, 101A', 101B, or 101B'. The vertical piece is attached to the table surface, and the horizontal pieces are attached from the vertical rod. Unlike the virtual images, the horizontal pieces are not suspended in space. This further reinforces a player's perception that the virtual images are suspended in space.

Figure 4:
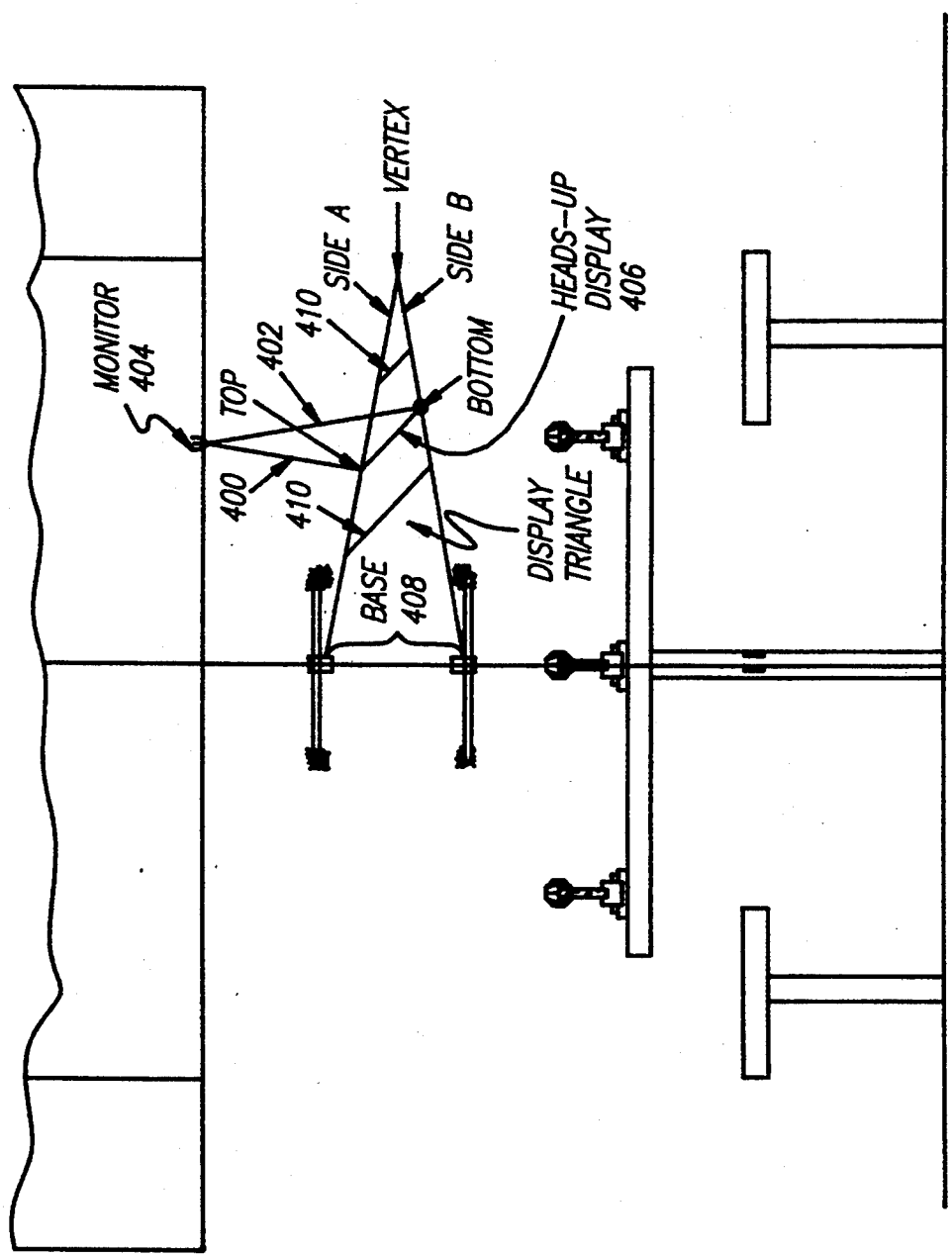
FIG. 4 illustrates a technique to optimize the dimensions of a HUD and the virtual video imaging of the present invention.
Figure 5A:
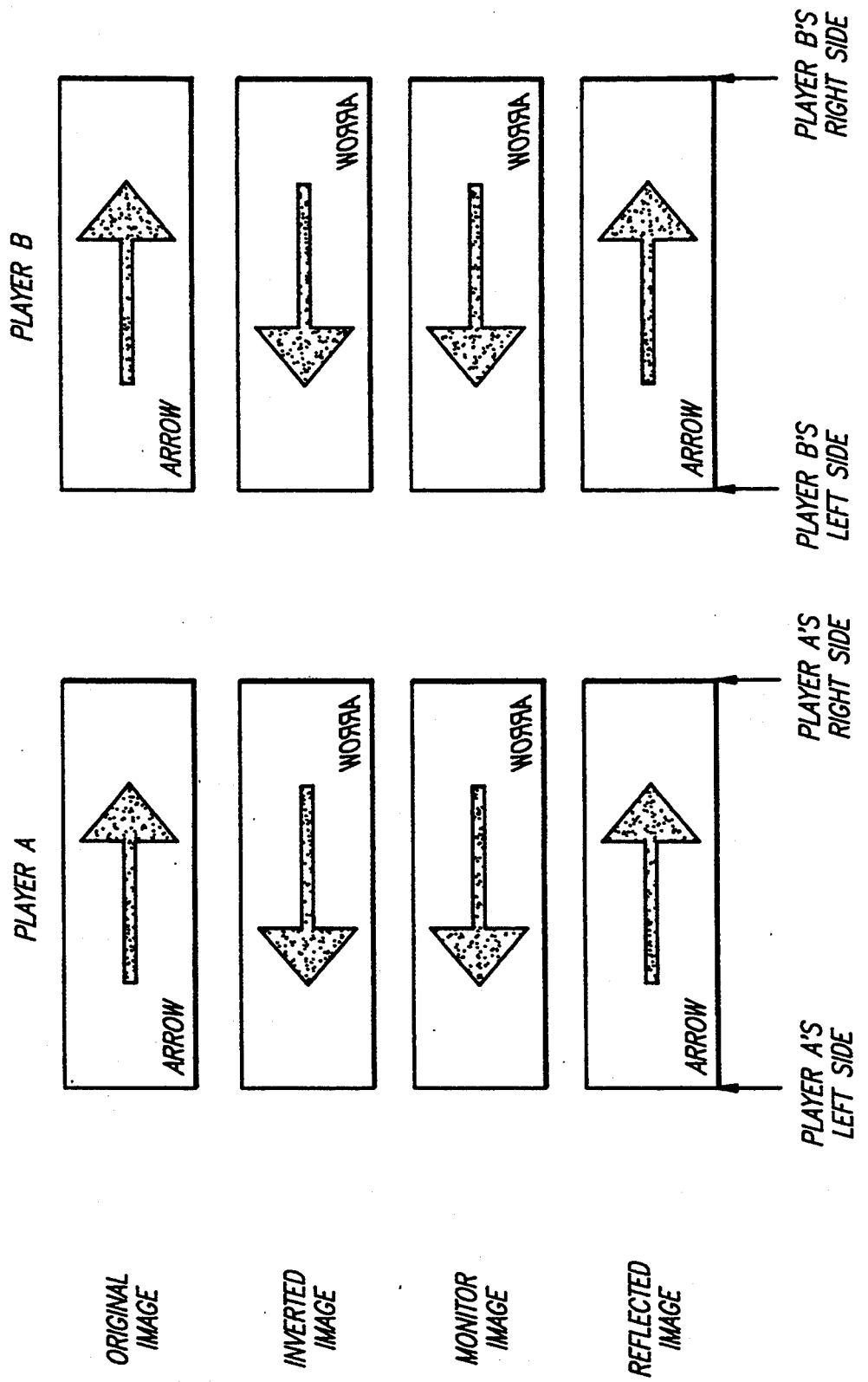
FIGS. 5A and 5B illustrate techniques for inverting the original image.
Figure 5B:
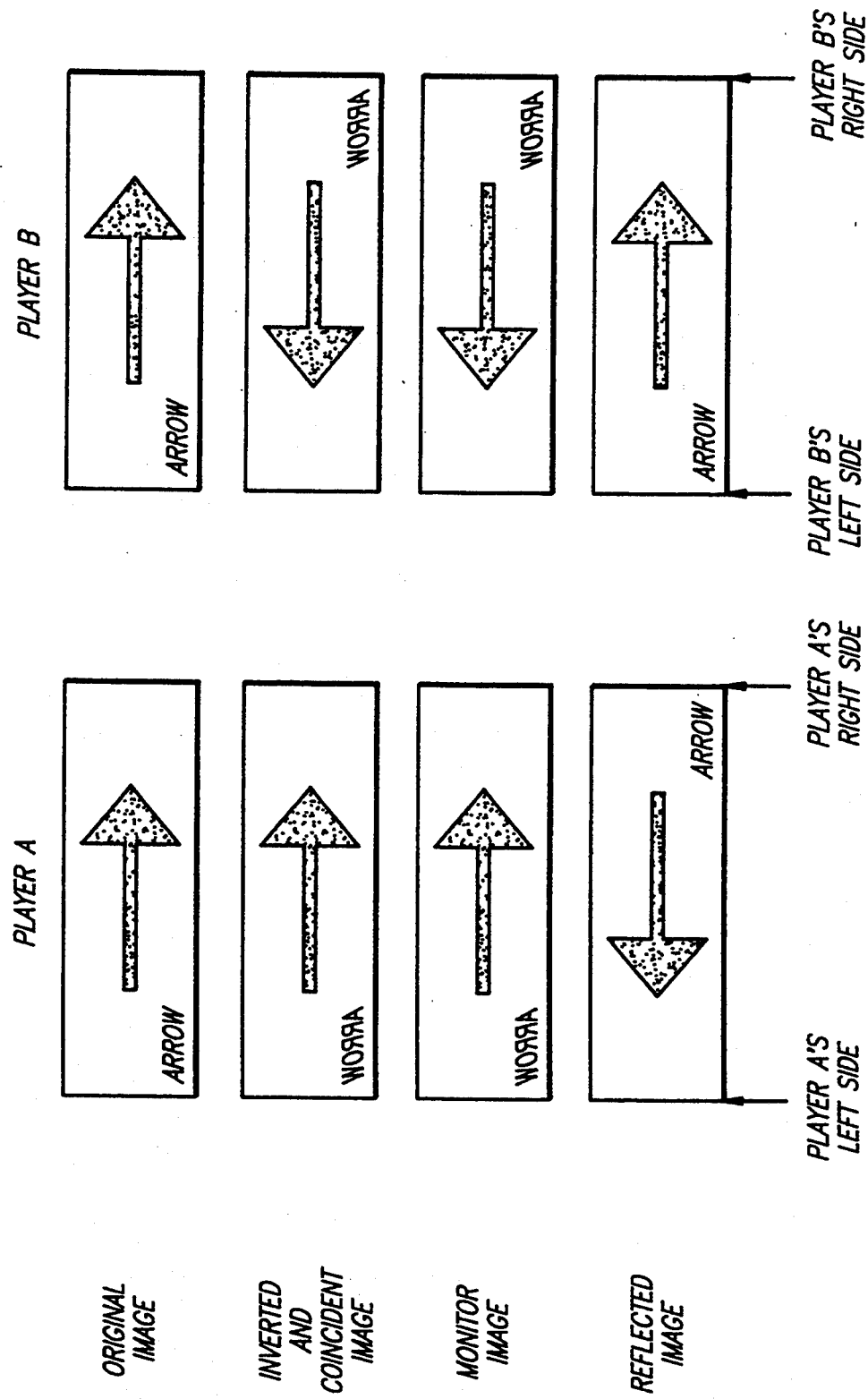

The dimensions of the HUD and location of the monitor can be determined based on the desired dimension of the virtual video image, the HUD angular orientation and the HUD's distance from the player. FIG. 4 illustrates a technique that optimizes the dimensions of a HUD and location of the monitor thereby optimizing the virtual video effect of the present invention.

The Display Triangle establishes the framework for determining the HUD's dimensions and monitor location. Base 408 of the display triangle is equal to the length of the desired virtual video image. The vertex of the display triangle represents the position of a player's point of view relative to base 408. The sides of the display triangle (i.e., Side A and Side B) are formed by connecting each end of the base to the vertex.

HUD 406 is placed somewhere within the display triangle such that Top (i.e., upper edge of the HUD) is positioned somewhere along or outside Side A and Bottom (i.e., bottom edge of the HUD) is positioned somewhere along or outside Side B. Top and Bottom are positioned along Side A and Side B respectively such that the vector formed by Top and Bottom represents the HUD with an angular positioning of forty-five degrees (45°) relative to the horizontal plane (e.g., plane of monitor). Monitor 404 is located above HUD 406 by projecting Top via Line 400 toward Monitor 404, and projecting Bottom via Line 402 toward Monitor 404.

Alternate HUD locations 410 illustrate the dimensional changes to the HUD as the angular orientation remains constant and Top and Bottom points are varied along Side A and Side B, respectively. As can be seen, the length of the HUD will increase as the HUD's position moves closer to the base of the Display Triangle (i.e., Base 408), or decrease as it moves away from Base 408.

Thus, given the desired dimension of the virtual video image (i.e., base 408), the distance of the player from the virtual image (i.e., vertex), a Display Triangle is identified. The angular orientation of the HUD (i.e., 45°) dictates the relative positions of Top and Bottom. A HUD is drawn within the Display Triangle at a 45° angle, and Monitor 404 is positioned above the HUD's position. This provides the optimal virtual video image for the present invention.

Second Surface Reflection

Figure 6A:
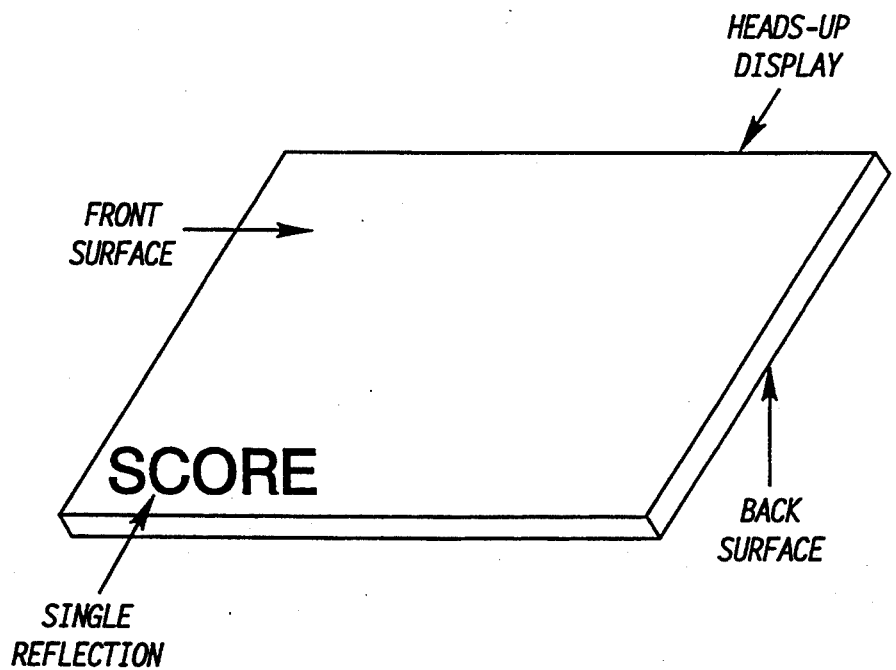
FIGS. 6A and 6B relate to the shadow effect of first and second surface reflections.
Figure 6B:
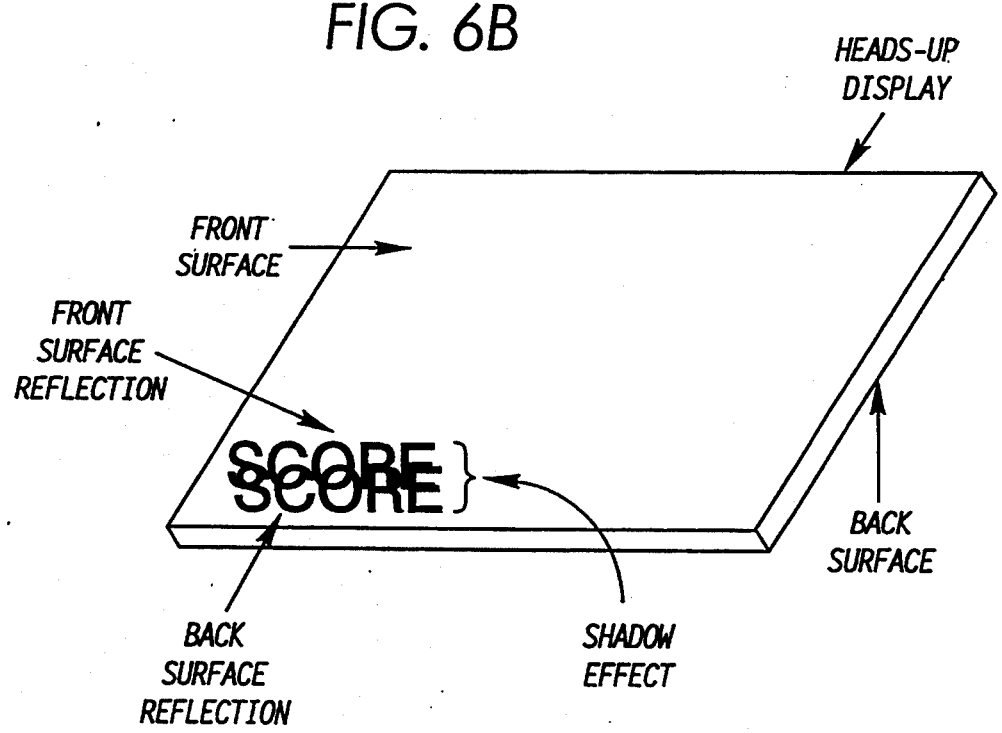

Preferably, a reflected image should appear as illustrated in FIG. 6A. However, reflective surfaces (e.g., HUD) can produce a shadow effect that is caused by the reflection from a first surface (e.g., front side) and a second surface (e.g., back side). FIG. 6B illustrates the shadow effect caused by the reflections from the front and back surfaces. The present invention provides the ability to minimize the shadow effect by placing a degree of coating on the front and back surfaces. This anti-reflection feature of the present invention is optional, and augments the virtual video imaging provided by the present invention. However, the other features of the present invention may be used in the absence of the anti-reflection feature.

In the preferred embodiment of the present invention, a coating with approximately an 18–20% reflectivity is placed on the front surface of the HUD and a coating with approximately 1% reflectivity is used for the back surface of the HUD. This virtually eliminates the shadowing effect in FIG. 6B and results in the reflection illustrated in FIG. 6A.

Reflection Process

Referring to FIG. 1A, the HUD reflects the image displayed on the Monitor and the image's reflection is reviewed by a player. Therefore, the image reflected onto the HUD and viewed by a player is the inverse (i.e., the left and right of the image displayed on the monitor. If the monitor's image has the same orientation as the original image (i.e., original image produced by an image generator), the image viewed by a player is the inverse of the original image. This process of reflection impacts the graphical, textual, and control elements of the present invention.

Figure 2A:
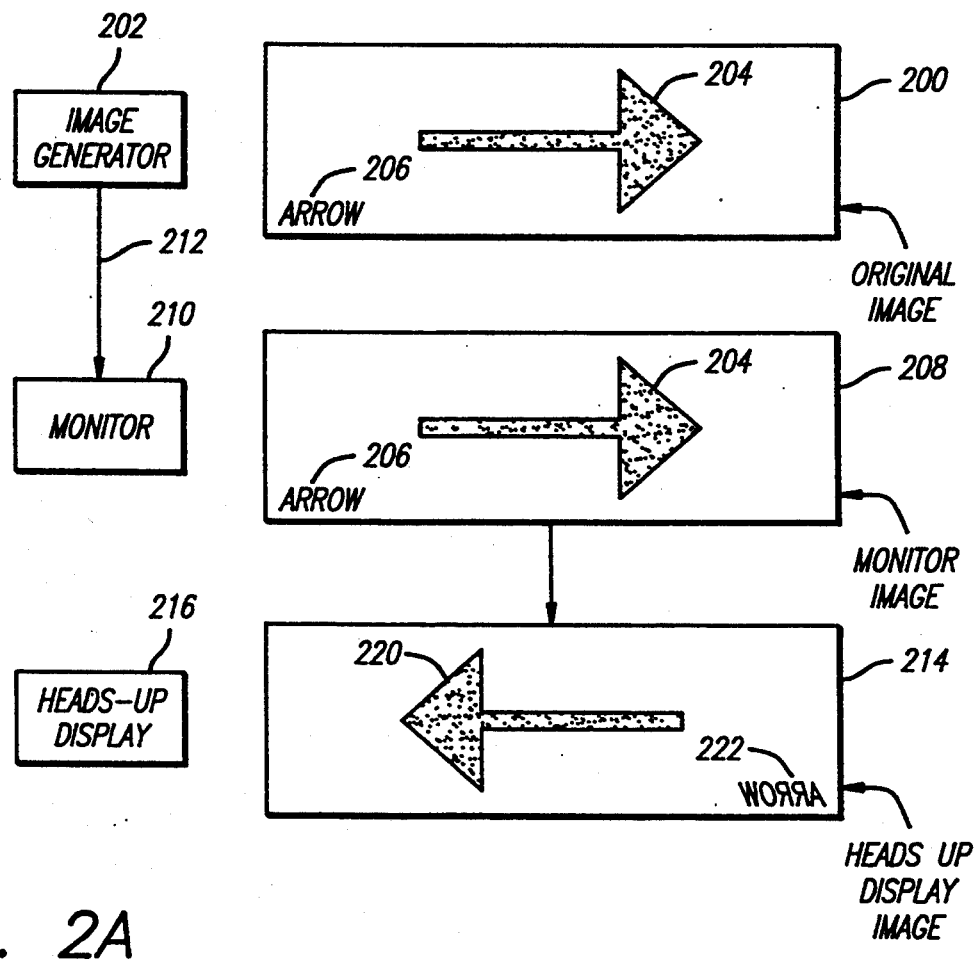
FIG. 2A illustrates an image at each stage of progression from its generation to its display on the HUD for viewing by a player.

To further illustrate the reflection process, FIG. 2A depicts an image at each stage of progression from its generation to the image's reflection from the HUD for review by a player. Original image 200 is provided by image generator 202. The image can be comprised of both graphic and textual symmetrical or asymmetrical components. FIG. 2A illustrates an asymmetrical graphical component (i.e. arrow) 204, and text 206 (i.e., "ARROW"). Arrow 204 points from left to right and text 206 appears in the lower left corner of the image.

Original image 200 is transmitted to Monitor 210 via line 212. Monitor Image 208, contains arrow 204 and text 206 and is identical to Original Image 200. HUD reflects the image displayed on Monitor 210. HUD Image 214 is the image of Original Image 200 seen by a player. As can be seen, HUD Image 214 is the inverse of Original Image 200. HUD Image 214 is a reflection of Monitor Image 208. Thus, arrow 220 is the inverse of arrow 204 and text 222 is the inverse of text 204. The inverted text 222 appears in the lower right corner of the HUD, and the inverted arrow 220 points from right to left.

Since the end result of the reflection process is the inverse of the original, the reflection process effects the control elements of the present invention. Referring to FIG. 2A, the HUD Image is an inverse of the Original Image. Someone viewing the HUD Image will believe that a movement from arrow head to the base of the arrow head is a movement from left to right. However, such a movement is actually a movement from right to left in the original image. Therefore, when the HUD Image is the inverse of the original image, the control elements of the present invention must compensate for this incongruity such as inverting the signals received from the joystick.

Reflection Compensation

Figure 2B:
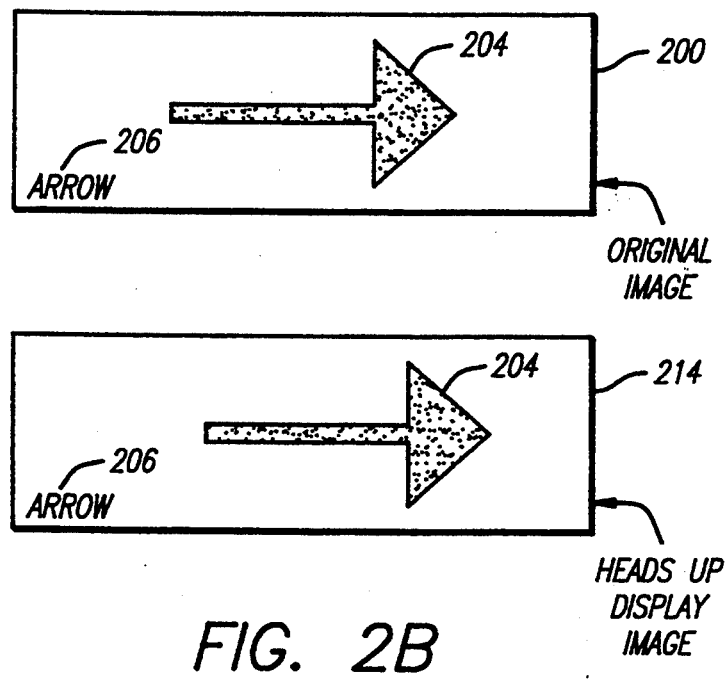
FIG. 2B illustrates the inversion capability of the present invention.

The compensation capabilities provided by the present invention are based on the resulting image seen by a player. For example, one embodiment of the present invention provides the ability to invert the original image such that the original image and the HUD image are identical. FIG. 2B illustrates this inversion process. The graphic and textual components in Original Image 200 and HUD Image 214 have the same orientation. Thus, the HUD image viewed by a player has the same orientation as the original image provided by the image generator (e.g., video game). That is, the player will see arrow 204 and text 206. The following is a discussion of various images seen by two players (i.e., A and B) and possible compensation techniques that may be needed for each.

The table of FIG. 7 illustrates four possible pairs of resulting images that can be generated using the present invention, depending on operations performed on the graphic elements of the original image, on the text of the original image, and on the control elements. Columns 3A–3D correspond to the examples of FIGS. 3A–3D respectively. The entries in the row titled "resulting image" indicate the image seen by each player A and B. For example, the entry in the row titled "resulting image" in column 3A is "reflection/reflection". This means that each player sees a reflection of the original image.

The entries in the row titled "graphical elements" indicate operations performed on the graphical portion of the original image. A straight line indicates that no operation is performed on the graphical portion. A pair of arrows indicates that an inverting operation is performed. Similarly, for the rows entitled "control elements" and "textural elements", a straight line means that no operation is performed and arrows indicate an inverting operation.

Each of the configurations of columns 3A–3D are described below in conjunction with FIGS. 3A–3D respectively.

Reflection/Reflection

Figure 3A:
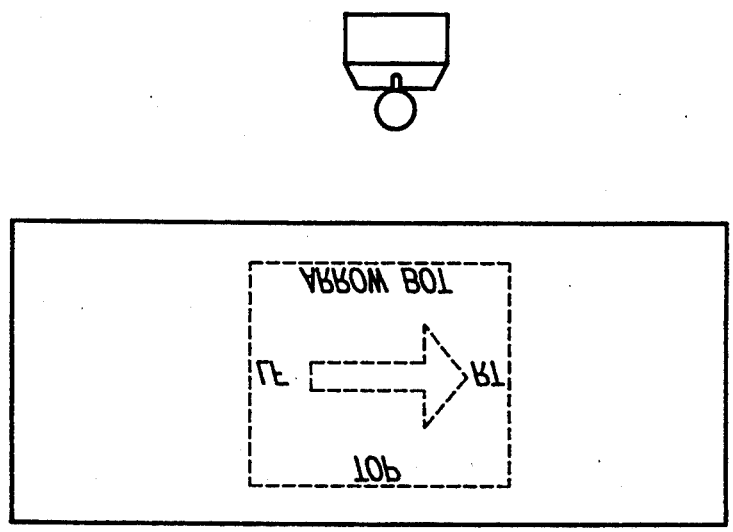
FIGS. 3A-3D illustrate four different pairs of resulting images using the present invention.
Figure 3A:
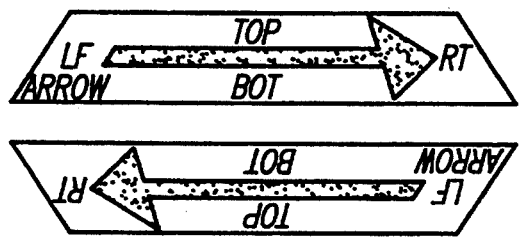
Figure 3A:
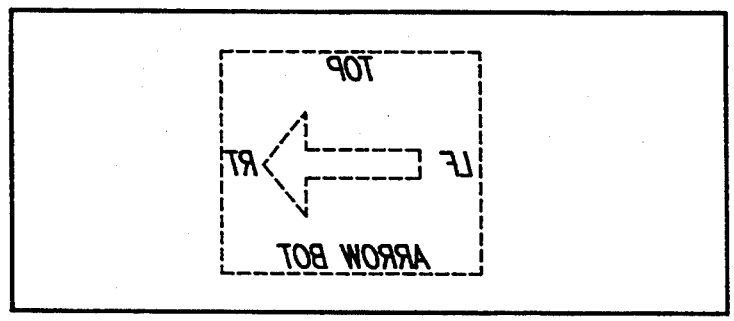
Figure 3A:
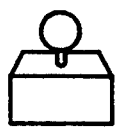

FIG. 3A provides an illustration of player A and B's resulting images where both player's resulting image is a reflection of the original image. Player B's perspective is illustrated by viewing the Figure from the bottom of the figure toward the top of the figure while player A's perspective is from the top down. Looking at the figure from Player B's perspective, player B's resulting image is a reflection of player B's Monitor Image. The arrow in the monitor image is pointing from left to right, however the arrow in the resulting image is pointing from the players' right to the players' left. Similarly, the textual components in the resulting image are the inverse of the text in the monitor image.

Player A's perspective can be viewed from the top of the figure looking toward the bottom. Like player B, player A views a resulting image that is the inverse of the A's monitor image. Since the monitor images are the same as the original image, the resulting images are the inverse of the original image. Thus, the textual elements viewed by each player are in inverse order.

Further, the graphical elements are in the resulting images are the inverse of the original image. For example, when player B views the arrow in the resulting image from the left to right, B will be scanning the image from the arrow's head to its base. However, as can be seen in B's monitor image, a scan of monitor image (i.e., as well as the original image) from left to right scans the arrow's base to its head. Thus, player B's directional orientation is the inverse of the original image's directional orientation Therefore, when B is pointing to the right-hand side of the resulting image, B will actually be pointing to the left-hand side of the original image.

Original/Original

Figure 3B:
Figure 3B:
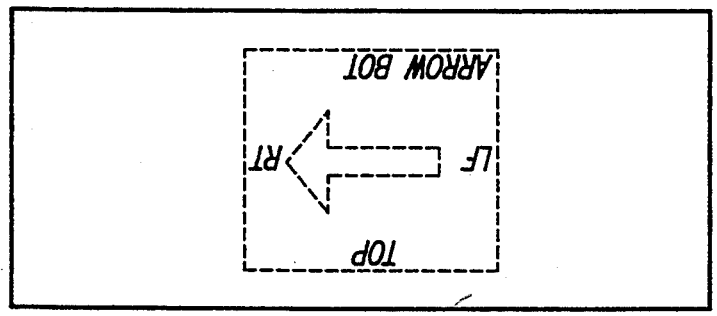
Figure 3B:
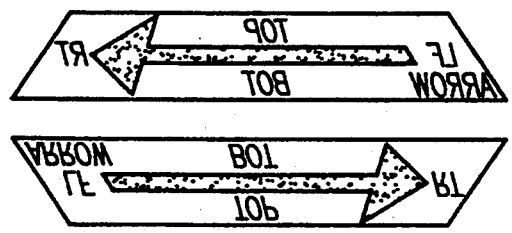
Figure 3B:
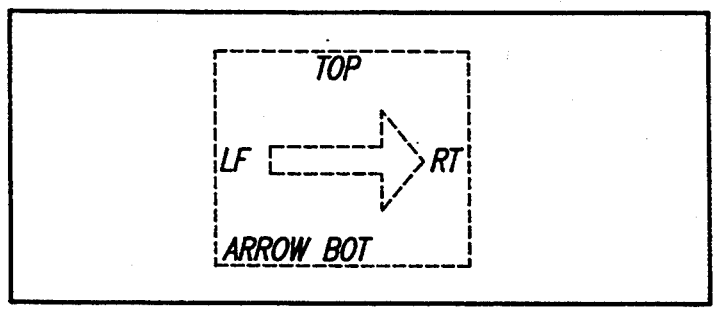
Figure 3B:
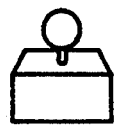

FIG. 3A illustrates an example where the textual components in both of the resulting images is inverted. Thus, the text is difficult to read. FIG. 3B provides an illustration of player A and B's resulting images where both players' resulting images have the same orientation as the original image (i.e., the monitor images are the inverse of the original image and the resulting images are the inverse of the monitor image). As in FIG. 3A, Player B's perspective is illustrated by viewing the Figure from the bottom up while player A's perspective is from the top down.

Because the resulting images are the same as the original image, the graphical and textual elements in the resulting images have the same orientation has in the original image, and the textual components can be read from left to right. Further, the players' graphical components have the same orientation as in the original image.

Reflection/Original

Figure 3C:
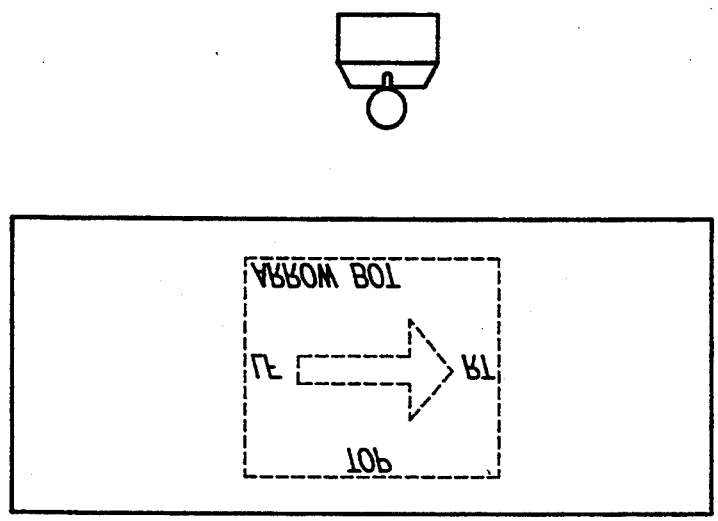
Figure 3C:
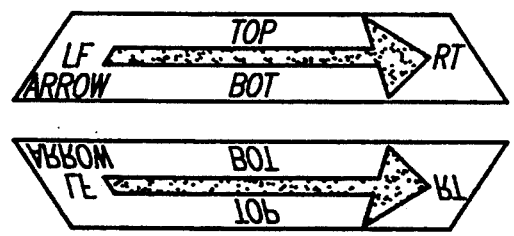
Figure 3C:
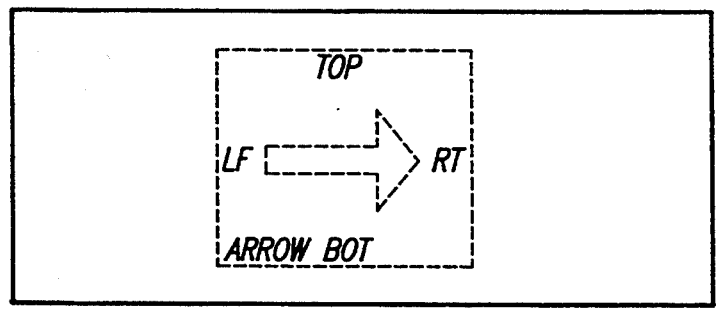
Figure 3C:
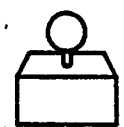

FIG. 3C provides an illustration of player A and B's resulting images where one players' resulting image (player A) is a reflection of the original image and the other players' (player B) resulting image is a reflection of the inverse of the original image. Player B's perspective is illustrated by viewing the Figure from the bottom of the sheet containing the Figure toward the top of the sheet. Player A's perspective is illustrated by viewing the Figure from the top of the sheet containing the Figure toward the bottom of the sheet.

Looking at the Figure from Player B's perspective, player B's resulting image is a reflection of player B's Monitor Image, an inverse of the original image. The arrow in the monitor image is pointing from right to left, however the arrow in the resulting image is pointing from the players' left to the players' right. The textual components in the monitor image are inverted, but appear as normal readable text in the resulting image seen by Player B.

Player A views a resulting image that is the inverse of the A's monitor image. Since the monitor image is the same as the original image, the resulting image is the inverse of the original image. Thus, the textual elements viewed by player A are in inverse order. However, as can be seen in FIG. 3C, the graphic images are coincident. That is, when the players are looking at the same action point (e.g. the point of the arrow), each player is looking at substantially the same location.

Modified Original/Original

FIGS. 3A and 3B illustrate a situation where each player will be viewing the graphical elements of their respective images from a different orientation. Referring to FIG. 3B, when player B looks at the head of the arrow in B's resulting image, B's line of sight will be directed toward the left side of the B's resulting image and the right side of A's resulting image (i.e., from A's perspective). However, when player A looks at the head of the arrow in A's resulting image, A's line of sight will be directed toward the left side of A's resulting image and the right side of B's resulting image (i.e., from B's perspective). The present invention can be used in this manner, however, when play is concentrated on one side of the resulting images, each player will appear to the other to be looking at the wrong side of the image.

Figure 3D:
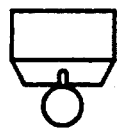
Figure 3D:
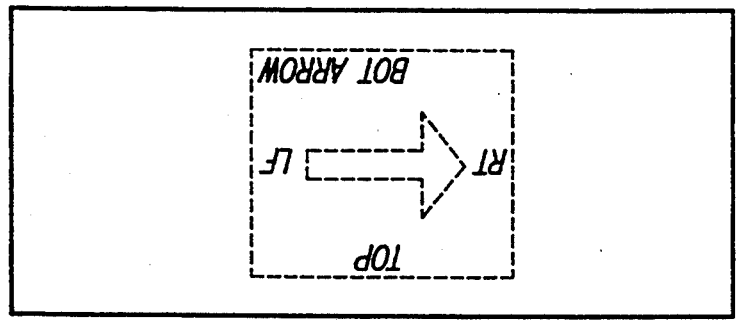
Figure 3D:
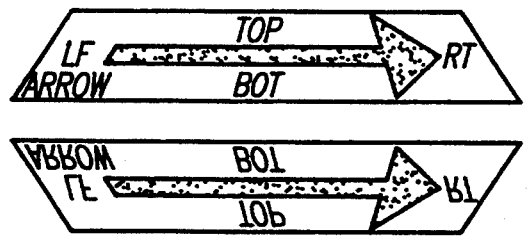
Figure 3D:
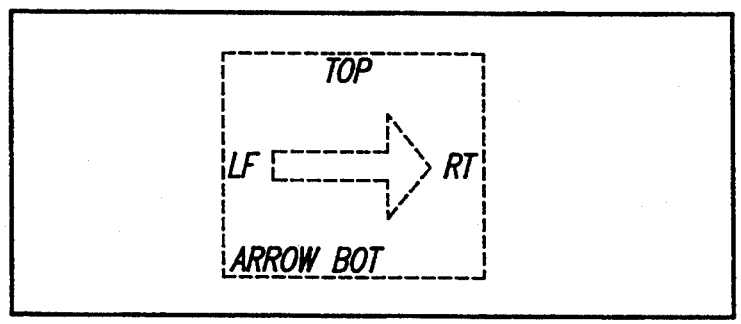
Figure 3D:
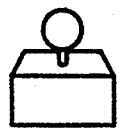

FIG. 3D provides an illustration of player A and B's resulting images where player B's resulting image is the same as the original image, (i.e., B's monitor image is the inverse of the original image and B's resulting image is the inverse of the monitor image). However, the graphical and textual components of the original image are treated differently to yield player A's resulting image.

The graphical components (i.e., arrow in FIGS. 3A–D) in the original image are not inverted before they are viewed by player A. Thus, A's resulting image contains graphical components that are the inverse of the original image. However, the textual components in the original image are inverted prior to appearing on player A's monitor image. Thus, A's resulting image contains text that has the same orientation as in the original image, and can be read from left to right.

The operations performed on the two monitor images results in resulting images that provide coincident lines of sight. It is as though one player is viewing the virtual image from the opposite side from the side being viewed by the other player. This is best illustrated by folding the figure in half horizontally. By doing so, it can be seen that the graphical components (e.g., the tips of the arrowheads) and the textual components in both of the resulting images are apparently coincident. Thus, both players will appear to the other to be looking at the same area within the virtual image.

Hardware Image Manipulation

Figure 2C:
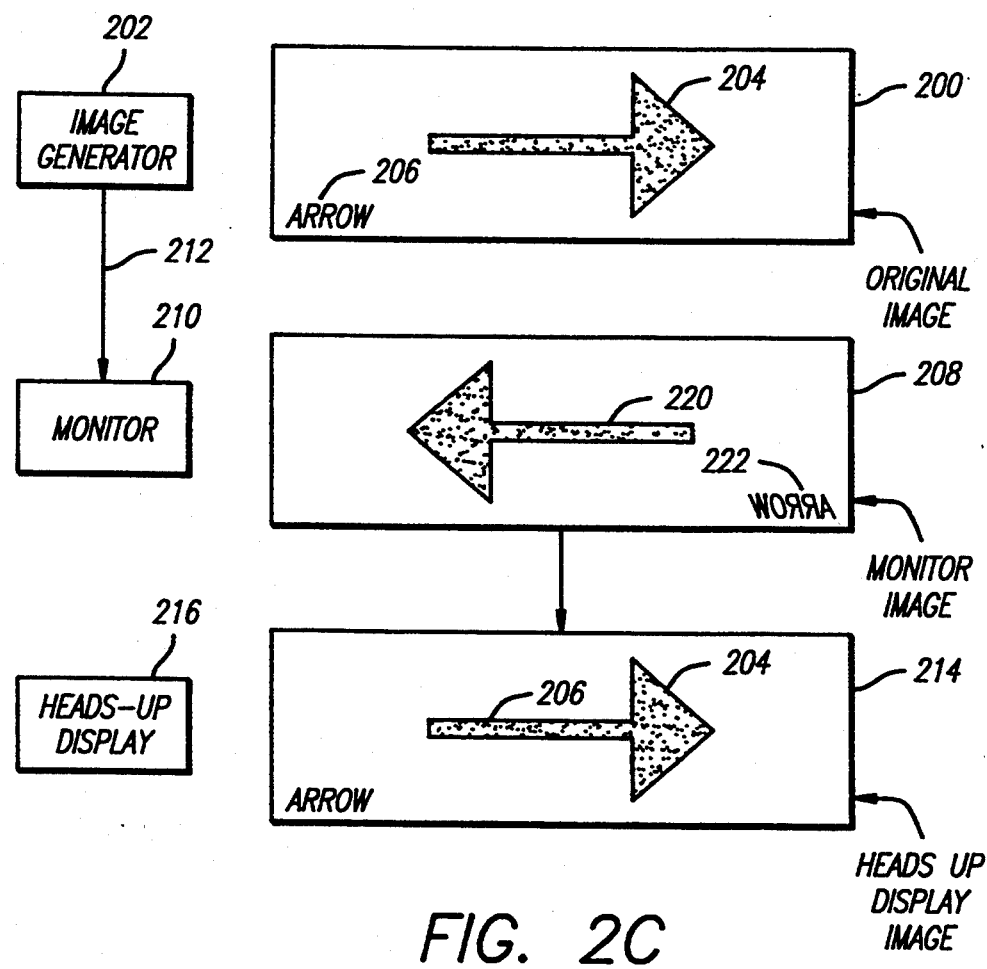
FIG. 2C illustrates a method of providing the correct orientation using hardware.

The inversion can be performed using either hardware or software alternatives. FIG. 2C illustrates a method of providing the correct orientation using hardware. The Image Generator 202 provides image 200 with arrow 204 and text 206. Image 200 is transmitted to Monitor 210 via communication line 212. The polarity of the coils in Monitor 210 are reversed to perform a backwards scan. A backwards scan causes Monitor 210 to scan the image provided by Image Generator 202 in reverse order. Thus, Original Image 200 is transmitted to Monitor 210 and inverted as it is output on Monitor 210. Monitor 210 inverts Original Image 200 to produce Monitor Image 208 comprised of arrow 220 and text 222 (i.e., the inverse of arrow 204 and text 206, respectively). HUD 216 reflects Monitor Image 208 to produce HUD Image 214 (i.e., a reflection of Monitor Image 208). Since HUD Image 214 is a reflection of Monitor Image 208 and Monitor Image 208 is the inverse of Original Image 200, HUD Image 214 is the inverse of Monitor Image 214 and has the same orientation as Original Image. Thus, HUD Image 214 is comprised of arrow 204 and text 206.

Software Image Manipulation

Figure 2D:
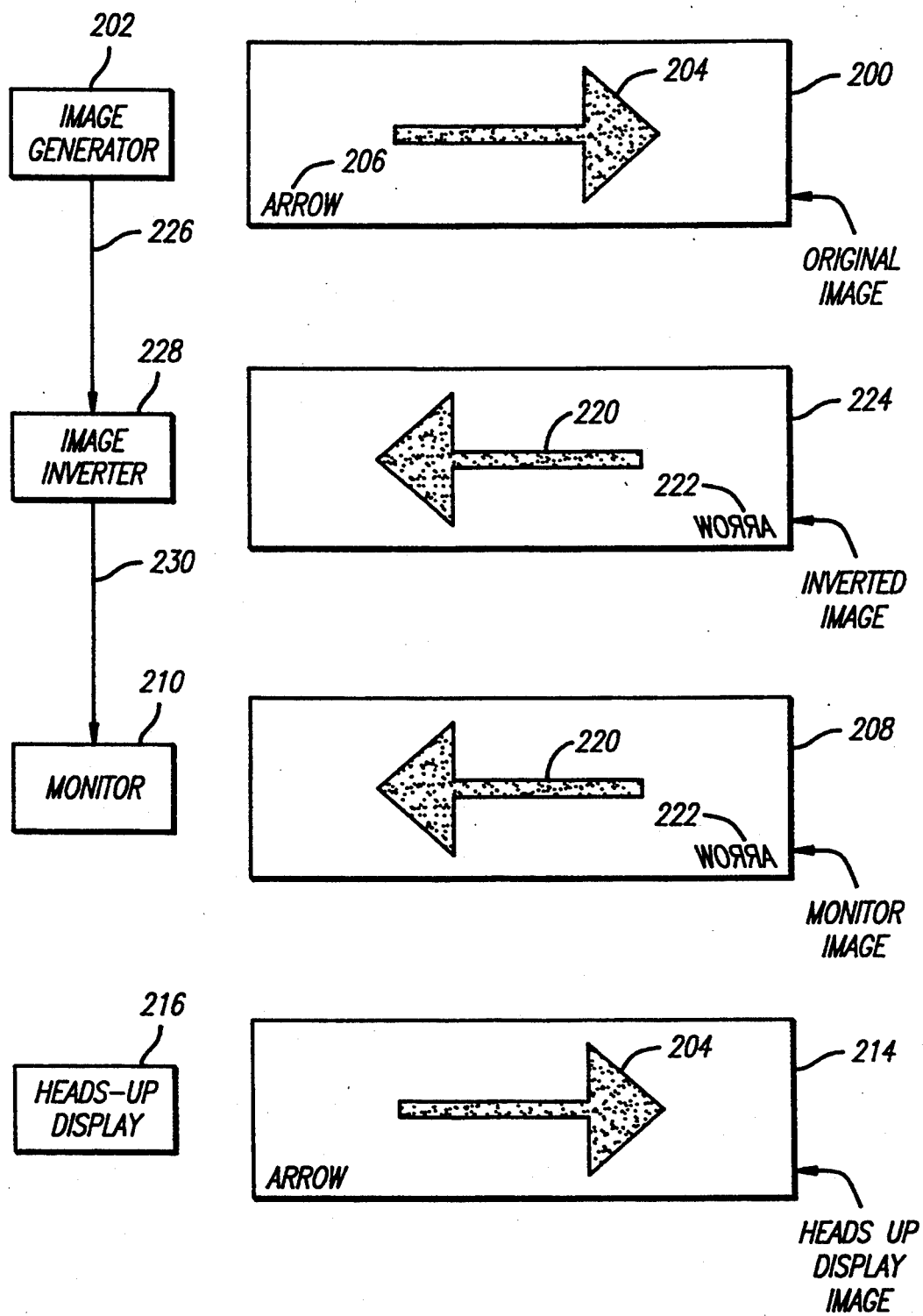
FIG. 2D illustrates the process for inverting an original image using software.

The present invention can also be implemented such that the inversion process is manipulated using software (e.g., digital video editor or computer). FIG. 2D illustrates the process for inverting Original Image 200 using software. Image Generator 202 provides Image 200 comprised of arrow 204 and text 206. Original Image 200 is transmitted to Image Inverter 228 via 226. Image Inverter 228 inverts Original Image 200 to produce Inverted Image 224.

Inverted Image 224 is comprised of arrow 220 and text 222 (i.e., the inverse of arrow 204 and text 206). Inverted Image 224 is transmitted to Monitor 210 via 230 and is output as Monitor Image 208. Monitor Image 208 and Inverted Image 224 are identical. HUD 216 reflects Monitor Image 208 to produce HUD Image 214 (i.e., a reflection of Monitor Image 208). Since HUD Image 214 is a reflection of Monitor Image 208 and Monitor Image 208 is the inverse of Original Image 200, HUD Image 214 is the inverse of Monitor Image 214 and has the same orientation as Original Image 200. Thus, HUD Image 214 is comprised of arrow 204 and text 206.

Character Inversion

FIG. 3D illustrates that text components can be positioned such that the position of opposing, like components are coincident (i.e., positional coincidence). However, the letters within like text components (e.g., "ARROW" in FIG. 3D) are not coincident. Thus, the letter "A" in the "ARROW" text component of player A's resulting image is not coincident with the letter "A" in the same text component of player B's resulting image (i.e., order coincidence).

Complete coincidence (positional and order coincidence) results in the letters of one of the "ARROW" components being in reverse order, and results in the text being difficult to read. To achieve complete coincidence for both the text and the graphics components, the text components of an image can be addressed independent of the graphic components. It can be seen, however, that complete coincidence of text components will effect the readability of the text component for one of the players.

A determination of whether to make a textual component absolutely coincident in opposing images and to sacrifice the readability of the text can be dependent on the purpose of the text. For example, text that is considered to be supplemental or informational (e.g., score tally) does not have to be completely coincident. In such an instance, positional coincidence will be sufficient to maintain the virtual video characteristics of the present invention. Information or supplemental text is not considered to be part of the action and, therefore, the readability of such text is more important than absolute coincidence.

A small percentage of textual components may be considered integral to the perceived action. A still smaller percentage of text components will be of such dimension that the coincident line of sight of the present invention may be impacted. In this instance, both positional and order coincidence may be needed. That is, integral text that is of such a dimension to affect the line of sight can be displayed in reverse order such that each component of the text is aligned with the same component in the opposing image. Using a software inversion technique, such text can be individually addressed to achieve order coincidence. Thus, complete coincident will be achieved and the line of sight maintained.

Thus, a method and apparatus for a virtual video game whereby players sit opposite each other and view the game and each other through a semi-transparent image generated in real-time through the use of a first-surface reflection has been provided.

ALPHA CHANNEL VIRTUAL IMAGE

One embodiment of the present invention includes one or more virtual image regions that are optically aligned so as to appear coincident with one or more liquid crystal regions. An object used to create the virtual image may be two dimensional or three dimensional. The liquid crystal regions may have a one-to-one correspondence with the picture elements or pixels of the virtual image. In the case of multiple liquid crystal regions for each object projected in the virtual image, a composite image of the object against the liquid crystal elements can be made to move smoothly, since as the virtual image moves, the corresponding liquid crystal regions can be controlled to match the movement of the virtual image.

Figure 8:
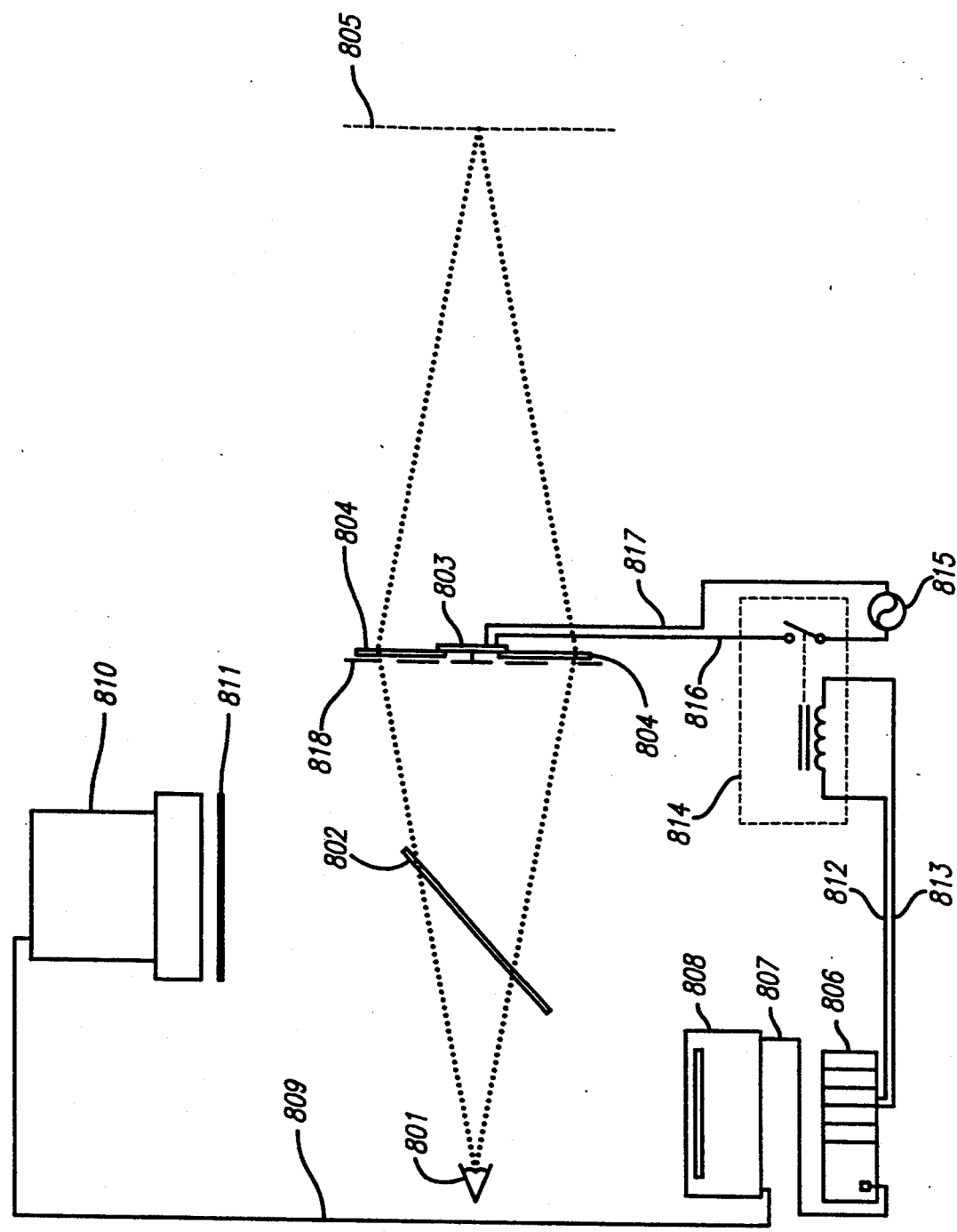
FIG. 8 is a diagram illustrating an embodiment of the present invention including a liquid crystal display (LCD) element.

FIG. 8 is a diagram illustrating an embodiment of the present invention including a liquid crystal display (LCD) element. Viewer 801 looks toward image 805. Image 805 may be any type of image, for example a real or virtual image, one or more persons or two or three dimensional objects, an image on a cathode ray tube (CRT), LCD or other display means, a projected image, a hologram, some other image, or a combination of the above. Panel 804 and LCD element 803 are interposed between viewer 801 and image 805 and lie in substantially the same plane as virtual image 818. HUD 802 is interposed between panel 804 and viewer 801. LCD element 803 lies in substantially the same plane as panel 804. LCD element 803 fills an aperture in panel 804. HUD 802 may be constructed of a beam splitter having a front surface reflectivity of 18% and a rear surface reflectivity of 1% at a 45° angle. Beam splitters having other front and rear surface reflectivities may be used. One example of an LCD element may be obtained from UCE Inc. of Norwalk, Conn. Panel 804 may be constructed of any opaque material, although transparent or translucent materials may be used for panel 804 to provide alternative optical effects.

Controller 806 provides a signal through connection 807 to video image source 808. Video image source 808 provides a video signal through video connection 809 to video monitor 810. Video monitor 810 is equipped with micro-louvers 811 to block light rays from video monitor 810 that are not traveling substantially perpendicular to the plane of the face of the video monitor. Micro-louvers 811 prevent light from video monitor 810 from being visible to viewer 801 directly (without reflecting from HUD 802). Light rays from video monitor 810 are directed toward HUD 802. Some portion of the light rays from video monitor 810 are reflected from the front surface of HUD 802 and directed toward viewer 801.

Controller 806 may be an industrial process control device, a theatrical control device, a general purpose computer, or some other computer or control apparatus. Connection 807 may be an RS-232C serial connection, a parallel data connection, or some other type of communications connection. Video image source 808 may be a computer, a videocassette recorder (VCR), a camera, a video disk player, such as Sony LVA-7000, or some other source of a video image. Video connection 809 may be coaxial cable, a radio frequency (RF) link, a fiber optic cable or some other type of video connection. Video monitor may be based on a CRT, such or Sony PVM-2030, or on some other type of image display device, such as a backlit LCD panel or an LED panel. Video image source 808, video connection 809 and video monitor 810 may be replaced by any other image producing means, such as one or more illuminated two or three dimensional objects, a motion picture, a slide projector, a computer graphics monitor, or a holographic display using laser light, white light, or some other type of light.

Micro-louvers 811 may be a micro-louver panel such as 3M LCF ABRO 0 OB 48 CLR GLS 032 manufactured by 3M of St. Paul, Minn. Alternatively, other optics, such as a focusing lens may be used.

Video monitor 801 is located at a distance away from HUD 802 equal to the distance of panel 804 away from HUD 802. Such placement assures that images derived from reflections from HUD 802 of light rays from video monitor 810 will appear to be located on panel 804 and, if LCD element 803 is not transparent, on LCD element 803. However, video monitor 810 may alternatively be placed at other distances from HUD 802. Variation of the placement of video monitor 810 or of panel 804 and 803 may be used to make the image from HUD 802 appear to be located at a different position.

LCD element 803 is located in an aperture in panel 804. LCD element 803 may be driven by an alternating current (AC) source or left undriven. In the preferred embodiment, a dynamic scattering LCD is used. When undriven, LCD element 803 is substantially clear, permitting light from image 805 to pass through the aperture 804, through HUD 802 and to viewer 801. When driven, the degree of transparency of LCD element 803 is decreased. By controlling the AC signal used to drive LC element 803, the relative opacity of LCD element 803 can be varied continuously. When left undriven, LCD element 803 remains transmissive to light rays rather than reflective. By preventing the transmission of light through LCD element 803, light from image 805 can be blocked from reaching viewer 801. By blocking light from image 805, light from video monitor 810 is reflected from HUD 802 to viewer 801 without interference from light from image 805.

Controller 806 is coupled to relay 814 via connections 812 and 813. Relay 814 switches a connection between AC source 815 and LCD element 803. AC voltages that pass through relay 814 when relay 814 is closed are transmitted through connections 816 and 817 to LCD element 803 and provide control over the transparency of LCD element 803. By varying the frequency and/or amplitude of the AC, the diffusion of the LCD can be varied. Since controller 806 controls both video signal source 808 and LCD element 803, controller 806 can be used to coordinate the display of images on video display 810 with the operation of LCD element 803.

To display a virtual image that appears to be at LCD element 803 or at some other location between image 805 and viewer 801 (i.e. in plane 818), LCD element 803 is driven to reduce its transparency and an image from video monitor 810 can be made to appear to be in register with LCD element 803. The image from video monitor 810 will be visible to viewer 801, while image 805 will not be visible to viewer 801.

The present invention may also be practiced with more than one viewer. Two viewers may be located across from one another with an LCD element between them. When the LCD element is transparent, the viewers can see one another. When the LCD element is opaque, the viewers cannot see each other. Multiple pairs of viewers may be positioned diametrically opposite one another. Two pairs of viewers can be aligned on orthogonal axes to allow independent operation and effect of their respective LCD elements.

To allow viewer 801 to see image 805, controller 806 can clear the coincident region of the video image from video monitor 810, preventing light rays from video monitor 810 from being reflected by HUD 802 to viewer 801. Controller 806 can also deactivate relay 814, removing the AC signal to LCD element 803. Without an applied AC signal, LCD element 803 becomes transparent and allows viewer 801 to see image 805 through LCD element 803. Simultaneous switching of the video image on video monitor 810 and of the AC power to LCD element 803 allows easy placement and removal of images that appear to exist between image 805 and viewer 801. By gradually increasing the intensity of the video image on video monitor 810 and gradually decreasing the transparency of LCD element 803, an image will gradually appear to viewer 801 in an area that had been transparent. Similarly, an image may be made to "disappear" in front of background image 805 by decreasing the intensity of the video image on video monitor 810 and increasing the transparency of LCD element 803.

Image 805 may include any type of image, such as a 2-dimensional or 3-dimensional object, a video monitor, such as Sony PVM-2030, a HUD, a hologram, or another type of image or device for providing an image. Video monitor 810 may be mounted above HUD 802, or at another orientation to HUD 802, for example, below to the left or to the right of HUD 802. HUD 802 may be repositioned to provide the correct display of the video image from video monitor 810.

Although FIG. 8 shows a single LCD element 803 surrounded by an opaque panel 804, the present invention may be practiced with multiple LCD elements. For example, LCD elements may be arranged in a tiled or tessellated pattern and individually controlled to allow selected portions of image 805 to be visible while other portions of image 805 are obscured.

One application of the present invention when practiced with multiple LCD elements includes a multiple player game that begins with an image of brick wall covered continuously with bricks or with a few bricks missing. The players then perform some action or actions to remove bricks from the wall. As bricks are removed, a larger portion of the image of the other player becomes visible. After continued play, the players may be able to eliminate enough bricks that the players become fully visible to one another.

When the present invention is practiced with multiple LCD elements, the multiple LCD elements need not be of a particular size, shape or number. For example, the present invention may be practiced with a relatively small number of LCD elements, each having a relatively large area, or with a relatively large number of LCD elements, each having a relatively small area. One example of an arrangement of LCD elements with which the present invention may be practiced is a matrix of small LCD elements of the type commonly used for laptop computers and for LCD graphics displays. Pixelated, raster-scanned liquid crystal panels having large numbers of discretely addressable liquid crystal elements may be used. With such a LCD arrangement, control of the transmissivity of light rays from image 805 may be performed on a small scale. Because of the high resolution that can be achieved with a large matrix of small LCD elements, the LCD elements may be driven in complex patterns, for example, those representative of images. Thus, images of objects with detailed outlines can be made to appear in the plane of the LCD elements or in another location with a transparent background. The transparent background allows viewers to see images behind the LCD elements. The high resolution of such LCD arrangements also allows smooth motion of an image from HUD 802 against a transparent background.

Viewer 801 may be one or more persons or one or more devices for viewing images such as a video cameras or other types of cameras or imaging systems. Viewer 801 may move around in the three dimensional space in front of HUD 802, thus allowing viewer 801 to see various regions of image 805 even if the aperture of panel 804 is small.

By controlling the brightness of local areas of the image provided by video monitor 810, the intensity of regions of the virtual image presented by HUD 802 can be controlled. By controlling the transparency of LCD element 803, the transparency of the virtual image presented by HUD 802 can be controlled. Both the intensity and transparency can be varied over a wide range. Thus, alpha channel control is provided for virtual images.

Although the preferred embodiment of the present invention utilizes a dynamic scattering LCD that is clear when undriven, other LCD's can be used. For example, and LCD that is opaque when undriven, and that becomes more transparent when driven, may be used.

I claim:

1. A display comprising:
   a first image;
   an image reflecting means for reflecting said first image to produce a reflected first image viewable along a line of sight;
   a liquid crystal region comprising at least one liquid crystal element, said liquid crystal region for controlling a transparency of said reflected first image, said liquid crystal region interposed with said image reflecting means and a background image;
   said background image aligned along said line of sight.

2. A multi-level imaging system comprising:
   controlling means for controlling a video image source and a connection switching means;
   said video image source coupled to said controlling means, said video image source providing a video signal to an image display means;
   said image display means coupled to said video image source, said image display means directing a first image to an image reflecting means;
   said connection switching means coupled to said controlling means, said connection switching means varying a connection between a liquid crystal region and a power source;
   a background image;
   said liquid crystal region comprising at least one liquid crystal element, said liquid crystal region interposed with said image reflecting means and said background image.

3. The multi-level imaging system of claim 2 wherein said controller is a computer system.

4. The multi-level imaging system of claim 2 wherein said controller is an industrial process control device.

5. The multi-level imaging system of claim 2 wherein said controller is a theatrical control device.

6. The multi-level imaging system of claim 2 wherein said video image source is a computer system.

7. The multi-level imaging system of claim 2 wherein said video image source is a videocassette recorder.

8. The multi-level imaging system of claim 2 wherein said video image source is a video disk player.

9. The multi-level imaging system of claim 2 further including a light ray deflector to prevent visible direct light from reaching said image display means.

10. The multi-level imaging system of claim 2 further comprising a panel including an aperture in which said liquid crystal region is positioned.

11. The multi-level imaging system of claim 10 wherein a first distance exists between said panel and said image reflecting means and a second distance exists between said image display means and said image reflecting means.

12. The multi-level imaging system of claim 11 wherein said first distance and said second distance are equal.

13. The multi-level imaging system of claim 2 wherein said connection switching means varies said liquid crystal region's degree of transparency.

14. The multi-level imaging system of claim 13 wherein said connection switching means causes a closed connection between said liquid crystal region and said power source and varies a frequency and amplitude of said power source to vary said liquid crystal region's degree of transparency.

15. The multi-level imaging system of claim 13 wherein said connection switching means causes an open connection between said liquid crystal region and said power source to vary said liquid crystal region's degree of transparency.

16. The multi-level imaging system of claim 2 wherein said liquid crystal region comprises a plurality of liquid crystal displays.

17. The multi-level imaging system of claim 16 wherein said plurality of liquid crystal displays are arranged in a tiled pattern.

18. The multi-level imaging system of claim 16 wherein said plurality of liquid crystal displays are controlled individually.

19. The multi-level imaging system of claim 2 wherein said image display means includes a brightness control to vary intensity of regions of said first image.

20. An imaging system comprising:
    a first image generator for generating an image in a first observation plane;
    a second image generator for generating an image in a second observation plane;
    opacifying means disposed between said first observation plane and said second observation plane;
    switching means coupled to said opacifying means for selectably controlling regions of said opacifying means to render portions of said opacifying means transparent;
    wherein said first observation plane, said second observation plane and said opacifying means are aligned along a line of sight.

21. The system of claim 20 wherein said opacifying means comprise a liquid crystal region, said liquid crystal region comprising at least one liquid crystal element.

22. The system of claim 20 wherein said opacifying means comprises a plurality of liquid crystal displays.

23. The system of claim 20 wherein said first image generating means comprises an image source and a heads up display.

24. The system of claim 20 wherein said second image generating means comprises a video monitor.

25. The system of claim 24 wherein said monitor is disposed substantially coincident with said second observation plane.

* * * * *